US008901486B2

(12) United States Patent
Langridge et al.

(10) Patent No.: US 8,901,486 B2
(45) Date of Patent: Dec. 2, 2014

(54) PERFORMANCE IMPROVEMENTS FOR RF-ONLY QUADRUPOLE MASS FILTERS AND LINEAR QUADRUPOLE ION TRAPS WITH AXIAL EJECTION

(71) Applicant: Micromass UK Limited, Wilmslow (GB)

(72) Inventors: David J. Langridge, Stockport (GB); Daniel James Kenny, Knutsford (GB)

(73) Assignee: Micromass UK Limited, Wilmslow (GB)

( * ) Notice: Subject to any disclaimer, the term of this patent is extended or adjusted under 35 U.S.C. 154(b) by 0 days.

(21) Appl. No.: 14/344,938

(22) PCT Filed: Sep. 17, 2012

(86) PCT No.: PCT/GB2012/052292
§ 371 (c)(1), (2), (4) Date: Mar. 14, 2014

(87) PCT Pub. No.: WO2013/038211
PCT Pub. Date: Mar. 21, 2013

(65) Prior Publication Data

US 2014/0284469 A1 Sep. 25, 2014

Related U.S. Application Data

(60) Provisional application No. 61/537,800, filed on Sep. 22, 2011.

(30) Foreign Application Priority Data

Sep. 16, 2011 (GB) .................................. 1116026.4

(51) Int. Cl.
*B01D 59/44* (2006.01)
*H01J 49/00* (2006.01)
*H01J 49/06* (2006.01)
*H01J 49/42* (2006.01)
*H01J 49/36* (2006.01)

(52) U.S. Cl.
CPC ............ *H01J 49/4215* (2013.01); *H01J 49/06* (2013.01); *H01J 49/0027* (2013.01); *H01J 49/36* (2013.01)
USPC ........... 250/282; 250/281; 250/283; 250/287; 250/288; 250/289; 250/290; 250/291; 250/292

(58) Field of Classification Search
USPC .................................. 250/281–283, 287–292
See application file for complete search history.

(56) References Cited

U.S. PATENT DOCUMENTS 3,473,019 A 10/1969 Brubaker
5,179,278 A 1/1993 Douglas (Continued)

FOREIGN PATENT DOCUMENTS

DE 1698202 6/1971
GB 2429579 2/2007

(Continued)

*Primary Examiner* — Jack Berman
*Assistant Examiner* — Meenakshi Sahu
(74) *Attorney, Agent, or Firm* — Diederiks & Whitelaw, PLC

(57) ABSTRACT

A RF only quadrupole rod set mass filter or mass analyzer and a linear quadrupole ion trap with axial ejection are disclosed comprising a first pair of rod electrodes, a second pair of rod electrodes and an energy filter. The first pair of rod electrodes is longer than the second pair of rod electrodes. Ions having desired mass to charge ratios experience fringing fields at an exit region which results in the ions possessing sufficient axial kinetic energy to be transmitted by the energy filter. Other ions possess insufficient axial kinetic energy to be transmitted by the energy filter and are attenuated.

9 Claims, 4 Drawing Sheets

(56) References Cited

U.S. PATENT DOCUMENTS

| | | | |
|---|---|---|---|
| 5,847,386 | A | 12/1998 | Thomson et al. |
| 2004/0108456 | A1 | 6/2004 | Sudakov et al. |
| 2005/0067564 | A1 | 3/2005 | Douglas et al. |
| 2007/0084998 | A1 | 4/2007 | Franzen et al. |
| 2008/0265155 | A1 | 10/2008 | Kovtoun |
| 2013/0240726 | A1 * | 9/2013 | Hasegawa et al. ............ 250/288 |

FOREIGN PATENT DOCUMENTS

| | | |
|---|---|---|
| JP | 2010/533353 | 10/2010 |
| WO | 2010/0141776 | 12/2010 |

* cited by examiner 5.3mm r0 q=0.9 for mass 500, 1.185 MHz, 1815.7 volts

PERFORMANCE IMPROVEMENTS FOR RF-ONLY QUADRUPOLE MASS FILTERS AND LINEAR QUADRUPOLE ION TRAPS WITH AXIAL EJECTION

CROSS REFERENCE TO RELATED APPLICATIONS

This application is the National Stage of International Application No. PCT/GB2012/052292, filed 17 Sep. 2012, which claims priority from and the benefit of U.S. Provisional Patent Application Ser. No. 61/537,800 filed on 22 Sep. 2011 and United Kingdom Patent Application No. 1116026.4 filed on 16 Sep. 2011. The entire contents of these applications are incorporated herein by reference.

BACKGROUND OF THE PRESENT INVENTION

Quadrupole rod sets are well known and comprise four rod electrodes. The quadrupole rod set may be operated in an ion guide only mode of operation by applying RF only voltages to the electrodes. In this mode of operation ions are not mass filtered. Alternatively, the quadrupole rod set may be operated as a mass filter or mass analyser by applying a combination of DC and RF voltages to the electrodes and then scanning the voltage(s) applied to the rod electrodes.

Quadrupole rod set ion traps are also known. A short set of quadrupole rods known as “stubbies” may be provided upstream and downstream of the quadrupole rod set in order to provide axial confinement within the ion trap. It is also known in an alternative arrangement to provide an annular electrode upstream and downstream of the quadrupole rod set in order to provide axial confinement within the ion trap. Ions may be resonantly excited from the ion trap by applying a combination of voltages to the electrodes.

It is also known operate a quadrupole rod set as a mass filter or mass analyser by applying just RF voltages to the rod electrodes. In this arrangement a grid electrode is provided downstream of the quadrupole rod set and a DC voltage is applied to the grid electrode. The grid electrode acts as an energy filter. Only ions having sufficient axial kinetic energy are able to overcome the DC potential barrier and be transmitted through the energy filter. Other ions with insufficient axial kinetic energy are reflected by the DC potential barrier. Such ions Invariably impact upon the rod electrodes and are lost to the system.

The known quadrupole rod set mass filter or mass analyser is operated so that ions having desired mass to charge ratios are radially excited and undertake large radial excursions without being lost to the rods. In the exit region of the quadrupole rod set fringing fields are present which cause coupling of the radial and axial energies of ions present in this region. Accordingly, ions having relative large radial energies acquire relatively large axial kinetic energies. Ions having desired mass to charge ratios thus emerge from the quadrupole rod set with relatively large axial kinetic energies and are able to overcome the energy filter and be onwardly transmitted whilst other ions are reflected by the energy filter and are lost to the system.

RF only quadrupole rod set mass filters or mass analysers have particular application in lower cost mass spectrometers. In particular, the mass filter or mass analyser is less expensive than a conventional quadrupole mass filter or mass analyser since there is no requirement to provide a DC voltage supply to the rod sets. Furthermore, the rod electrodes can be relatively short. RF only quadrupole rod set mass filters or mass analysers are therefore particularly useful in miniature mass spectrometers and mass spectrometers which are desired to have a relatively small footprint.

Linear quadrupole ion traps with axial ejection (“LQIT-WAE”) are also known and are similar to RF only quadrupole rod set mass analysers. An additional entrance electrode is provided upstream of the quadrupole rod set to confine ions axially within the ion trap.

Conventional RF only quadrupole rod set mass analysers suffer from the problem that they have relatively poor transmission and resolution performance.

Linear quadrupole ion traps with axial ejection have relatively better transmission and resolution performance than conventional RF only quadrupole rod set mass analysers. However, it would be desirable to further improve the performance of linear quadrupole ion traps with axial ejection.

It is therefore desired to improve the performance of RF only quadrupole rod set mass analysers and linear quadrupole ion traps with axial ejection.

SUMMARY OF THE PRESENT INVENTION

According to an aspect of the present invention there is provided a quadrupole rod set mass filter, mass analyser or ion trap comprising:

a first pair of rod electrodes;

a second pair of rod electrodes; and an energy filter, wherein the first pair of rod electrodes has a physical property which differs from a physical property of the second pair of rod electrodes.

According to an embodiment the physical property comprises axial length.

The first pair of rod electrodes preferably has a first axial length and the second pair of rod electrodes preferably has a second different axial length.

The difference $\Delta x$ between the first axial length and the second axial length is preferably selected from the group consisting of: (i) <1 mm; (ii) 1-2 mm; (iii) 2-3 mm; (iv) 3-4 mm; (v) 4-5 mm; (vi) 5-6 mm; (vii) 6-7 mm; (viii) 7-8 mm; (ix) 8-9 mm; (x) 9-10 mm; and (xi) >10 mm.

According to an embodiment the physical property comprises cross-sectional profile or shape.

The first pair of rod electrodes preferably has a first cross-sectional diameter or profile which decreases towards an exit region of the quadrupole rod set mass filter or mass analyser.

The second pair of rod electrodes preferably has a second cross-sectional diameter or profile which increases towards an exit region of the quadrupole rod set mass filter or mass analyser.

The first and second pairs of rod electrodes preferably have a first upstream portion and a second downstream portion, wherein the first and/or second rod electrodes have a substantially constant cross-sectional diameter or profile in the first upstream portion.

The cross-sectional diameter or profile of the first and/or second rod electrodes preferably varies throughout or along the second downstream portion.

The first and second pairs of rod electrodes preferably have a cross-sectional radius $r_0$ in the first upstream portion, the first pair of rod electrodes preferably have a cross-sectional radius $r_1$ adjacent an exit region of the second downstream portion and the second pair of rod electrodes preferably have a cross-sectional radius $r_2$ adjacent the exit region of the second downstream portion, wherein $r_1>r_0>r_2$.

The first upstream portion preferably comprises x % of the axial length of the quadrupole rod set mass filter, mass analyser or ion trap, wherein x is selected from the group consisting of: (i) <10%; (ii) 10-20%: (iii) 20-30%; (iv) 30-40%; (v) 40-50%; (vi) 50-60%; (viii) 60-70%; (ix) 70-80%; (x) 80-90%; (xi) >90%.

The first pair of rod electrodes preferably comprise one or more partial or complete first voids located adjacent an exit region of the quadrupole rod set mass filter, mass analyser or ion trap.

The one or more first voids are preferably arranged on an inwardly facing surface of the first pair of rod electrodes.

The second pair or rod electrodes preferably comprise either substantially no voids or one or more partial or complete second voids located adjacent an exit region of the quadrupole rod set mass filter, mass analyser or ion trap, wherein the one or more second voids are substantially different in depth, size, width or form to the one or more first voids.

The first and second pairs of rod electrodes preferably have a diameter and wherein the one or more first voids and/or the one or more second voids have a radial depth of y % of the diameter, wherein y is selected from the group consisting of: (i) <10%; (ii) 10-20%; (iii) 20-30%; (iv) 30-40%; (v) 40-50%; (vi) 50-60%; (viii) 60-70%; (ix) 70-80%; (x) 80-90%; and (xi) 90-100%.

According to an embodiment the physical property comprises the composition of the rod electrodes.

According to an embodiment the physical property comprises: (i) a dielectric or other coating applied to the rod electrodes; and/or (ii) a surface finish of the rod electrodes.

The energy filter preferably comprises one or more grid electrodes.

The energy filter preferably comprises a DC potential barrier and/or an RF pseudo-potential barrier.

The energy filter preferably comprises a physical barrier arranged so that ions having desired mass to charge ratios and which possess a first radial energy avoid impacting the barrier whereas ions having undesired mass to charge ratios and which possess a second radial energy impact upon the barrier.

The first radial energy is preferably greater or less than the second radial energy.

According to an embodiment ions having desired mass to charge ratios are radially excited so as to possess a first radial energy and are accelerated axially due to fringing fields at an exit region of the mass filter, mass analyser or ion trap so that the ions having desired mass to charge ratios possess a first axial energy.

According to an embodiment ions having undesired mass to charge ratios are radially excited so as to possess a second radial energy and are accelerated axially due to fringing fields at an exit region of the mass filter, mass analyser or ion trap so that the ions having undesired mass to charge ratios possess a second axial energy.

According to an embodiment the ions having desired mass to charge ratios and having a first axial energy are able to overcome the energy filter and emerge axially from the quadrupole rod set mass filter, mass analyser or ion trap whereas the ions having undesired mass to charge ratios and having a second axial energy are unable to overcome the energy filter and are substantially attenuated.

According to another aspect of the present invention there is provided a quadrupole rod set mass filter, mass analyser or ion trap comprising:

a first pair of rod electrodes;

a second pair of rod electrodes; and an exit member optionally having one or more apertures, wherein either: (i) the exit member is tilted or otherwise arranged so that a portion of the exit member extends closer to the first pair of rod electrodes than the second pair of rod electrodes; and/or (ii) the one or more apertures are more closely aligned with the first pair of rod electrodes than with the second pair of rod electrodes.

The exit member may comprise a first section having a first composition and a second section having a second different composition.

The exit member is preferably arranged adjacent an exit region of the quadrupole rod set mass filter, mass analyser or ion trap.

The exit member preferably comprises a sheet electrode or grid electrode.

A portion of the exit member is preferably arranged along the central longitudinal axis of the quadrupole rod set at a distance $d_1$ from the end faces of the rod electrodes, wherein $d_1$ is selected from the group consisting of: (i) <1 mm; (ii) 1-2 mm; (iii) 2-3 mm; (iv) 3-4 mm; (v) 4-5 mm; (vi) 5-6 mm; (vii) 6-7 mm; (viii) 7-8 mm; (ix) 8-9 mm; (x) 9-10 mm; and (xi) >10 mm.

A DC and/or RF voltage is preferably applied to the exit member.

According to an embodiment ions having desired mass to charge ratios avoid impacting or are transmitted by the exit member whereas ions having undesired mass to charge ratios impact upon or are attenuated by the exit member.

The quadrupole rod set mass filter, mass analyser or ion trap preferably further comprises one or more first additional electrodes arranged downstream of the first and second pairs of rod electrodes and upstream and/or downstream of the energy filter or exit member, wherein the one or more first additional electrodes are arranged and adapted to confine ions axially within the quadrupole rod set mass filter, mass analyser or ion trap.

The quadrupole rod set mass filter, mass analyser or ion trap preferably further comprises one or more second additional electrodes arranged downstream of the first and second pairs of rod electrodes and upstream and/or downstream of the energy filter or exit member, wherein an extractive DC voltage is applied to the one or more second additional electrodes.

The quadrupole rod set mass filter, mass analyser or ion trap preferably further comprises one or more entrance electrodes arranged upstream of the first and second pairs of rod electrodes, the one or more entrance electrodes being arranged and adapted to confine ions axially within the quadrupole rod set mass filter, mass analyser or ion trap.

The quadrupole rod set mass filter, mass analyser or ion trap preferably further comprises a device arranged and adapted to apply a DC bias voltage to the first pair of electrodes and/or the second pair of electrodes in order to align ions with either the first pair of rod electrodes or the second pair of rod electrodes.

According to an embodiment the DC bias voltage applied to the first and/or second pair of electrodes has an amplitude selected from the group consisting of: (i) <−50V; (ii) −40 to −30V; (iii) −30 to −20V; (iv) −20 to −10V; (v) −10 to 0V; (vi) 0-10V; (vii) 10-20V; (viii) 20-30V; (ix) 30-40V; (x) 40-50V; and (xi) >50V.

The first pair of rod electrodes preferably comprise linear electrodes and/or the second pair of rod electrodes comprise linear electrodes.

The first pair of rod electrodes are preferably arranged so as to be parallel with the second pair of rod electrodes.

The first pair of rod electrodes and/or the second pair of rod electrodes preferably have a substantially circular or hyperbolic cross-section.

According to an embodiment either (i) one or more RF only voltages having a first amplitude are applied to the first pair of rod electrodes and/or one or more RF only voltages having a second amplitude are applied to the second pair of rod electrodes, wherein the second amplitude is the same as or different to the first amplitude; or (ii) one or more DC and RF voltages having a first RF amplitude are applied to the first pair of rod electrodes and/or one or more DC and RF voltages having a second RF amplitude are applied to the second pair of rod electrodes, wherein the second RF amplitude is the same as or different to the first RF amplitude.

According to an embodiment the amplitude and/or frequency and/or phase of an RF voltage applied to the first pair electrodes and/or the second pair of electrodes is varied, increased, decreased or ramped in order to cause desired ions to emerge or be emitted or ejected axially from the quadrupole rod set mass filter, mass analyser or ion trap.

According to an embodiment ions are caused to emerge or be emitted or ejected from the quadrupole rod set mass filter, mass analyser or ion trap either: (i) in order of mass or mass to charge ratio; or (ii) in reverse order of mass or mass to charge ratio.

According to an embodiment the quadrupole rod set mass filter or mass analyser comprises an RF only quadrupole rod set mass filter or mass analyser.

According to an embodiment the ion trap comprises a linear quadrupole ion trap with axial ejection.

According to another aspect of the present invention there is provided a method of mass spectrometry comprising:

guiding ions through a quadrupole rod set mass filter, mass analyser or ion trap comprising a first pair of rod electrodes, a second pair of rod electrodes and an energy filter wherein the first pair of rod electrodes has a physical property which differs from a physical property of the second pair of rod electrodes.

According to another aspect of the present invention there is provided a method of mass spectrometry comprising:

guiding ions through a quadrupole rod set mass filter, mass analyser or ion trap comprising a first pair of rod electrodes, a second pair of rod electrodes, an energy filter and an exit member optionally having one or more apertures, wherein either: (i) the exit member is tilted or otherwise arranged so that at least a portion of the exit member extends closer to the first pair of rod electrodes than the second pair of rod electrodes; and/or (ii) the one or more apertures are aligned or otherwise orientated so that at least a portion of the one or more apertures is closer to the first pair of rod electrodes than the second pair of rod electrodes.

According to another aspect of the present invention there is provided a quadrupole rod set mass filter, mass analyser or ion trap comprising:

a first pair of rod electrodes;

a second pair of rod electrodes; and an exit member comprising a first section having a first composition or a first surface coating arranged adjacent the first pair of electrodes and a second section having a second different composition or a second different surface coating arranged adjacent the second pair of electrodes.

According to another aspect of the present invention there is provided a method of mass spectrometry comprising:

guiding ions through a quadrupole rod set mass filter, mass analyser or ion trap comprising a first pair of rod electrodes, a second pair of rod electrodes and an exit member comprising a first section having a first composition or a first surface coating arranged adjacent the first pair of electrodes and a second section having a second different composition or a second different surface coating arranged adjacent the second pair of electrodes.

According to an aspect of the present invention there is provided a quadrupole rod set for a mass spectrometer, the quadrupole rod set comprising four rods wherein at least one or two of the rods have a first axial length and at least one or two of the rods have a second different axial length.

The difference Δx between the first axial length and the second axial length is preferably selected from the group consisting of: (i) <1 mm; (ii) 1-2 mm; (iii) 2-3 mm; (iv) 3-4 mm; (v) 4-5 mm; (vi) 5-6 mm; (vii) 6-7 mm; (viii) 7-8 mm; (ix) 8-9 mm; (x) 9-10 mm; and (xi) >10 mm.

According to an aspect of the present invention there is provided a quadrupole rod set for a mass spectrometer, the quadrupole rod set comprising four rods wherein the inscribed radius formed by the rods adjacent an axial ion exit region of the quadrupole rod set differs from the inscribed radius formed by the rods in a central axial region of the quadrupole rod set, wherein one or two of the rods have a radius $r_1$ adjacent the axial ion exit region of the quadrupole rod set and one or two of the rods have a radius $r_2$ adjacent the axial ion exit region of the quadrupole rod set, wherein $r_1>r_2$.

In the central region of the quadrupole rod set the rods preferably have a radius $r_0$ and wherein $r_1>r_0>r_2$.

According to an aspect of the present invention there is provided a mass spectrometer comprising:

a quadrupole rod set comprising four rods; and an exit member arranged immediately adjacent an axial ion exit region of the quadrupole rod set, wherein the exit member is non-planar and/or curved and/or tilted.

The exit member preferably comprises a sheet electrode.

The sheet electrode preferably comprises one or more apertures through which ions are transmitted.

A portion of the exit member is preferably arranged along the central longitudinal axis of the quadrupole rod set is arranged at a distance $d_1$ from the end faces of the rods, wherein $d_1$ is selected from the group consisting of: (i) <1 mm; (ii) 1-2 mm; (iii) 2-3 mm; (iv) 3-4 mm; (v) 4-5 mm; (vi) 5-6 mm; (vii) 6-7 mm; (viii) 7-8 mm; (ix) 8-9 mm; (x) 9-10 mm; and (xi) >10 mm.

According to an aspect of the present invention there is provided a mass spectrometer comprising:

a quadrupole rod set comprising four rods; and an exit member arranged adjacent an axial ion exit region of the quadrupole rod set, wherein the exit member comprises a planar electrode having one or more voids.

The one or more voids are preferably aligned with one or two of the rods.

The exit member is preferably arranged at a distance x mm from the central longitudinal axis of the quadrupole rod set, wherein x is selected from the group consisting of: (i) <1 mm; (ii) 1-2 mm; (iii) 2-3 mm; (iv) 3-4 mm; (v) 4-5 mm; (vi) 5-6 mm; (vii) 6-7 mm; (viii) 7-8 mm; (ix) 8-9 mm; (x) 9-10 mm; and (xi) >10 mm.

According to an aspect of the present invention there is provided a quadrupole rod set for a mass spectrometer, the quadrupole rod set comprising four rods wherein one or two of the rods comprise one or more first voids near the axial ion exit region of the quadrupole rod set and wherein one or two of the rods either have no voids near the axial ion exit region or comprise second different voids near the axial ion exit region.

The one or more first voids and/or the one or more second voids preferably comprise radial voids in the rods.

The one or more first voids and/or the one or more second voids preferably consist of one, two or three complete voids.

The downstream end and/or the upstream end of the four quadrupole rods preferably lie in substantially the same plane The one or more first voids and/or the one or more second voids may according to an alternative embodiment be partial.

The one or more first voids and/or the one or more second voids are preferably formed in the inner surface of the rods adjacent an ion guiding volume which is located within the volume defined by the inscribed radius of the rods.

The one or more first voids and/or the one or more second voids are preferably not formed in the outer surface of the rods so that the outer surface of the rods is substantially uninterrupted and continuous along the outer surface and/or length of the rods.

According to an aspect of the present invention there is provided a method of mass spectrometry comprising:

guiding ions through a quadrupole rod set, the quadrupole rod set comprising four rods wherein at least one or two of the rods have a first axial length and at least one or two of the rods have a second different axial length.

According to an aspect of the present invention there is provided a method of mass spectrometry comprising:

guiding ions through a quadrupole rod set, the quadrupole rod set comprising four rods wherein the inscribed radius formed by the rods adjacent an axial ion exit region of the quadrupole rod set differs from the inscribed radius formed by the rods in a central axial region of the quadrupole rod set, wherein one or two of the rods have a radius $r_1$ adjacent the axial ion exit region of the quadrupole rod set and one or two of the rods have a radius $r_2$ adjacent the axial ion exit region of the quadrupole rod set, wherein $r_1>r_2$.

According to an aspect of the present invention there is provided a method of mass spectrometry comprising:

guiding ions through a quadrupole rod set comprising four rods and an exit member arranged immediately adjacent an axial ion exit region of the quadrupole rod set, wherein the exit member is non-planar and/or curved and/or tilted.

According to an aspect of the present invention there is provided a method of mass spectrometry comprising:

guiding ions through a quadrupole rod set comprising four rods and an exit member arranged adjacent an axial ion exit region of the quadrupole rod set, wherein the exit member comprises a planar electrode having one or more voids.

According to an aspect of the present invention there is provided a method of mass spectrometry comprising:

guiding ions through a quadrupole rod set, the quadrupole rod set comprising four rods wherein one or two of the rods comprise one or more first voids near the axial ion exit region of the quadrupole rod set and wherein one or two of the rods either have no voids near the axial ion exit region or comprise second different voids near the axial ion exit region.

The preferred embodiment relates to an improvement to RF only quadrupole analysers and Linear Quadrupole Ion Traps With Axial Ejection ("LQITWAE").

The preferred embodiment improves the performance characteristics (resolution/transmission) of RF only quadrupoles and linear quadrupole ion traps with axial ejection by geometrical modification of the exit region of the device.

The geometrical modifications lead to modifications in the form of the exit fringing fields which results in improvements in performance.

The RF only quadrupole may be used as a relatively inexpensive single quad instrument or as a component in a hybrid instrument.

According to an embodiment the mass spectrometer may further comprise:

(a) an ion source selected from the group consisting of: (i) an Electrospray ionisation ("ESI") ion source; (ii) an Atmospheric Pressure Photo ionisation ("APPI") ion source; (iii) an Atmospheric Pressure Chemical ionisation ("APCI") ion source; (iv) a Matrix Assisted Laser Desorption ionisation ("MALDI") ion source; (v) a Laser Desorption ionisation ("LDI") ion source; (vi) an Atmospheric Pressure ionisation ("API") ion source; (vii) a Desorption ionisation on Silicon ("DIOS") ion source; (viii) an Electron Impact ("EI") ion source; (ix) a Chemical ionisation ("CI") ion source; (x) a Field ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray ionisation ("DESI") ion source; (xvi) a Nickel-63 radioactive ion source; (xvii) an Atmospheric Pressure Matrix Assisted Laser Desorption ionisation ion source; (xviii) a Thermospray ion source; (xix) an Atmospheric Sampling Glow Discharge ionisation ("ASGDI") ion source; and (xx) a Glow Discharge ("GD") ion source; and/or (b) one or more continuous or pulsed ion sources; and/or (c) one or more ion guides; and/or (d) one or more ion mobility separation devices and/or one or more Field Asymmetric Ion Mobility Spectrometer devices; and/or (e) one or more ion traps or one or more ion trapping regions; and/or (f) one or more collision, fragmentation or reaction cells selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an on-metastable molecule reaction device for reacting ions to form adduct or product ions; (xxviii) an ion-metastable atom reaction device for reacting ions to form adduct or product ions; and (xxix) an Electron ionisation Dissociation ("EID") fragmentation device; and/or (g) a mass analyser selected from the group consisting of: (i) a quadrupole mass analyser; (ii) a 2D or linear quadrupole mass analyser (iii) a Paul or 3D quadrupole mass analyser; (iv) a Penning trap mass analyser, (v) an ion trap mass analyser; (vi) a magnetic sector mass analyser (vii) Ion Cyclotron Resonance ("ICR") mass analyser, (viii) a Fourier Transform Ion Cyclotron Resonance ("FTICR") mass analyser; (ix) an electrostatic or orbitrap mass analyser; (x) a Fourier Transform electrostatic or orbitrap mass analyser (xi) a Fourier Transform mass analyser; (xii) a Time of Flight mass analyser; (xiii) an orthogonal acceleration Time of Flight mass analyser and (xiv) a linear acceleration Time of Flight mass analyser; and/or (h) one or more energy analysers or electrostatic energy analysers; and/or (i) one or more ion detectors; and/or (j) one or more mass filters selected from the group consisting of: (i) a quadrupole mass filter; (ii) a 2D or linear quadrupole ion trap; (iii) a Paul or 3D quadrupole ion trap; (iv) a Penning ion trap: (v) an ion trap; (vi) a magnetic sector mass filter, (vii) a Time of Flight mass filter; and (viii) a Wein filter; and/or (k) a device or ion gate for pulsing ions; and/or (l) a device for converting a substantially continuous ion beam into a pulsed ion beam.

The mass spectrometer may further comprise either:

(i) a C-trap and an Orbitrap™ mass analyser comprising an outer barrel-like electrode and a coaxial inner spindle-like electrode, wherein in a first mode of operation ions are transmitted to the C-trap and are then injected into the Orbitrap™ mass analyser and wherein in a second mode of operation ions are transmitted to the C-trap and then to a collision cell or Electron Transfer Dissociation device wherein at least some ions are fragmented into fragment ions, and wherein the fragment ions are then transmitted to the C-trap before being injected into the Orbitrap™ mass analyser; and/or (ii) a stacked ring ion guide comprising a plurality of electrodes each having an aperture through which ions are transmitted in use and wherein the spacing of the electrodes increases along the length of the ion path, and wherein the apertures in the electrodes in an upstream section of the ion guide have a first diameter and wherein the apertures in the electrodes in a downstream section of the ion guide have a second diameter which is smaller than the first diameter, and wherein opposite phases of an AC or RF voltage are applied, in use, to successive electrodes.

According to an embodiment the quadrupole rod set mass filter, mass analyser or ion trap further comprises a device arranged and adapted to supply an AC or RF voltage to the first and second pairs of rod electrodes. The AC or RF voltage preferably has an amplitude selected from the group consisting of: (i) <50 V peak to peak; (ii) 50-100 V peak to peak; (iii) 100-150 V peak to peak; (iv) 150-200 V peak to peak; (v) 200-250 V peak to peak; (vi) 250-300 V peak to peak; (vii) 300-350 V peak to peak; (viii) 350-400 V peak to peak; (ix) 400-450 V peak to peak; (x) 450-500 V peak to peak; and (xi) >500 V peak to peak.

The AC or RF voltage preferably has a frequency selected from the group consisting of: (i) <100 kHz; (ii) 100-200 kHz; (iii) 200-300 kHz; (iv) 300-400 kHz; (v) 400-500 kHz; (vi) 0.5-1.0 MHz; (vii) 1.0-1.5 MHz; (viii) 1.5-2.0 MHz; (ix) 2.0-2.5 MHz; (x) 2.5-3.0 MHz; (xi) 3.0-3.5 MHz; (xii) 3.5-4.0 MHz; (xiii) 4.0-4.5 MHz; (xiv) 4.5-5.0 MHz; (xv) 5.0-5.5 MHz; (xvi) 5.5-6.0 MHz; (xvii) 6.0-6.5 MHz; (xviii) 6.5-7.0 MHz; (xix) 7.0-7.5 MHz; (xx) 7.5-8.0 MHz; (xxi) 8.0-8.5 MHz; (xxii) 8.5-9.0 MHz; (xxiii) 9.0-9.5 MHz; (xxiv) 9.5-10.0 MHz; and (xxv) >10.0 MHz.

BRIEF DESCRIPTION OF THE DRAWINGS

Various embodiments of the present invention will now be described together with other arrangements given for illustrative purposes only, by way of example only, and with reference to the accompanying drawings in which.

DETAILED DESCRIPTION OF PREFERRED EMBODIMENTS

The operation of a conventional quadrupole rod set mass analyser will first be described.

A conventional quadrupole rod set mass analyser comprises four linear rod electrodes all having the same axial length. RF and DC voltages are applied to the rods in a particular ratio to achieve mass resolution.

A stability diagram for a quadrupole rod set mass analyser is well known to those skilled in the art and shows the relationship between a (on the y-axis) as a function of q (along the x-axis). The relationship is an approximately triangular curve with coordinates (0,0), (0.706,0.237) and (0.907,0).

According to a common arrangement the quadrupole rod set mass analyser is operated at the tip of a first stability region at about $q=0.706$, $a=0.237$ by applying a combination of DC and RF voltages in a manner which will be well understood by those skilled in the art.

However, it is also known that the quadrupole rod set may be operated as a mass analyser in a RF only mode using an instability condition at the right hand edge of the first stability region at about $q=0.9$. In this mode $a=0$ as no resolving DC is applied. Ions that are near $q=0.907$ are close to instability and will have larger radial excursions than the rest of the ion population with $q<0.907$. Ions with $q>0.907$ are fully unstable and are lost to the rods.

In the exit region of the quadrupole rod set fringing fields lead to coupling of the radial and axial energies of the ions. As a result, ions which have been radially excited to a relatively great extent exit with greater axial kinetic energies than other ions. The difference in axial energy of ions allows for mass discrimination by, for example, using a gridded energy filter.

Figure 1:
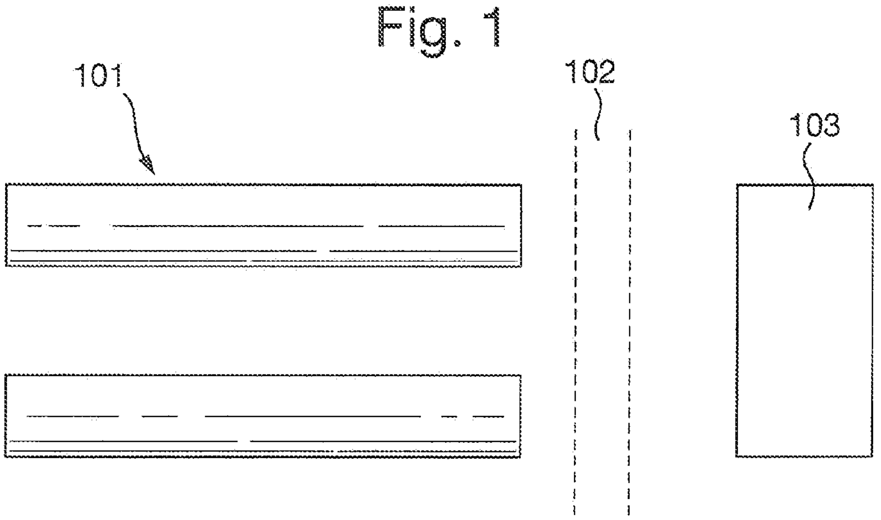
FIG. 1 shows a known RF only quadrupole rod set mass analyser with an energy filter comprising a planar grid electrode, an extractive grid electrode and an ion detector.

FIG. 1 shows a known arrangement comprising a RF only quadrupole rod set mass analyser comprising quadrupole rods 101, a pair of grid electrodes 102 and an ion detector 103. The first grid electrode comprises an energy filter. The second grid electrode has an extractive DC voltage applied to it.

A linear ion trap with axial ejection is also known and is similar to the RF only quadrupole rod set mass analyser as described above. An auxiliary RF voltage may be applied to the electrodes in order to bring ions having specific mass to charge ratios into resonance thus increasing the radial excursions of these ions. The increased radial excursions of the ions results in the ions having increased axial kinetic energy via interaction with the exit fringing fields. If sufficient axial energy is acquired then the ions can surmount the exit barrier or energy filter and are thus ejected axially from the ion trap.

In both these devices the interaction with the exit fringing fields plays an important role.

It is known that the transmission/resolution performance of an RF only quadrupole mass analyser or a linear quadrupole ion trap with axial ejection can be improved by either unbalancing the main quadrupole rod RF voltages or by applying some fraction of the main rod RF to an exit member (e.g. a grid) at an exit region of the device. This has the effect of reducing the voltage difference between one rod pair and the exit grid and increasing the voltage difference between the grid and the other rod pair. This leads to a reduction in the effective potential plotted axially in the plane of the rod pair with the reduced RF voltage (or equivalently the rod pair that is in phase with the grid RF) and likewise to a reduction in the axial component of the field due to the effective potential in this plane. Conversely, the effective potential is increased in the other plane.

Figure 2:
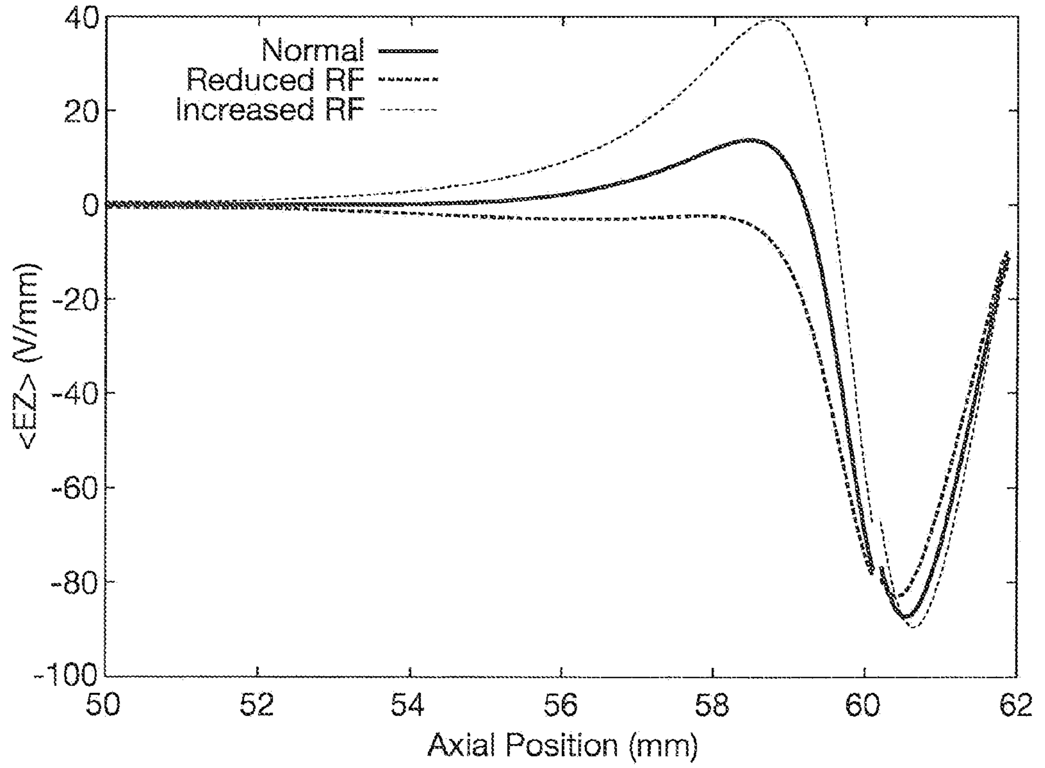
FIG. 2 shows a plot of the axial effective potential field versus axial position for a balanced system wherein the same amplitude RF voltage is applied to all four rods and an unbalanced system wherein one pair of rods is supplied with a RF voltage having a first amplitude and the other pair of rods is supplied with a RF voltage having a second different amplitude.

FIG. 2 shows the relationship between the axial effective potential field as a function of axial position (at a y-axis position of 4 mm) for a balanced system and a 20% unbalanced RF system with the RF reduced or increased on the y-rods (i.e. In the plane of the plot).

In the balanced system an effective symmetric pseudo-potential barrier is observed near the end of the rods before the extractive region due to the second grid electrode. If the rod RF voltage is reduced in the plane of the plot then this barrier is reduced. Conversely, if the rod RF voltage is increased then an increase in the effective pseudo-potential barrier is observed.

A small amount of resolving DC voltage of the correct polarity may be applied to ensure that ions are aligned with the rod pair plane with the reduced axial component of the RF effective potential field. Excited ions exiting the device that are aligned to the plane with the reduced RF effective potential field have a greater axial kinetic energy. As a result it is possible to discriminate between these ions and other unexcited ions.

Conversely, if the opposite polarity of DC is applied then ions are aligned with the rod pair plane that has an increased axial RF effective potential field. Excited ions in this axis exhibit reduced axial kinetic energies and thus reduced resolution/transmission.

While the exact mechanism for this effect is not fully understood, the role of the form of the fringing field in this process is important.

It is apparent that the form of the exit fringing fields plays an important role in the transmission/ejection of ions and can be modified by altering the voltages applied to the rods or by applying a voltage to the exit member/grid.

The preferred embodiment relates to a geometrical method of improving the resolution/transmission of an RF only quadrupole rod set mass analyser or a linear quadrupole ion trap with axial ejection.

According to various embodiments of the present invention geometrical modification of the rods in the exit region or of the exit member can lead to a modification of the form of the effective potential in the exit fringing field region. If the correct form of modification is applied then the fringing fields can be modified in such a way as to give increased transmission/resolution. A small DC voltage component may be utilised to align the ions in the correct axis although this is not essential.

According to an embodiment the ends of the rods may be offset such that one rod pair extends further towards the exit grid or energy filter than the other rod pair.

Figure 3:
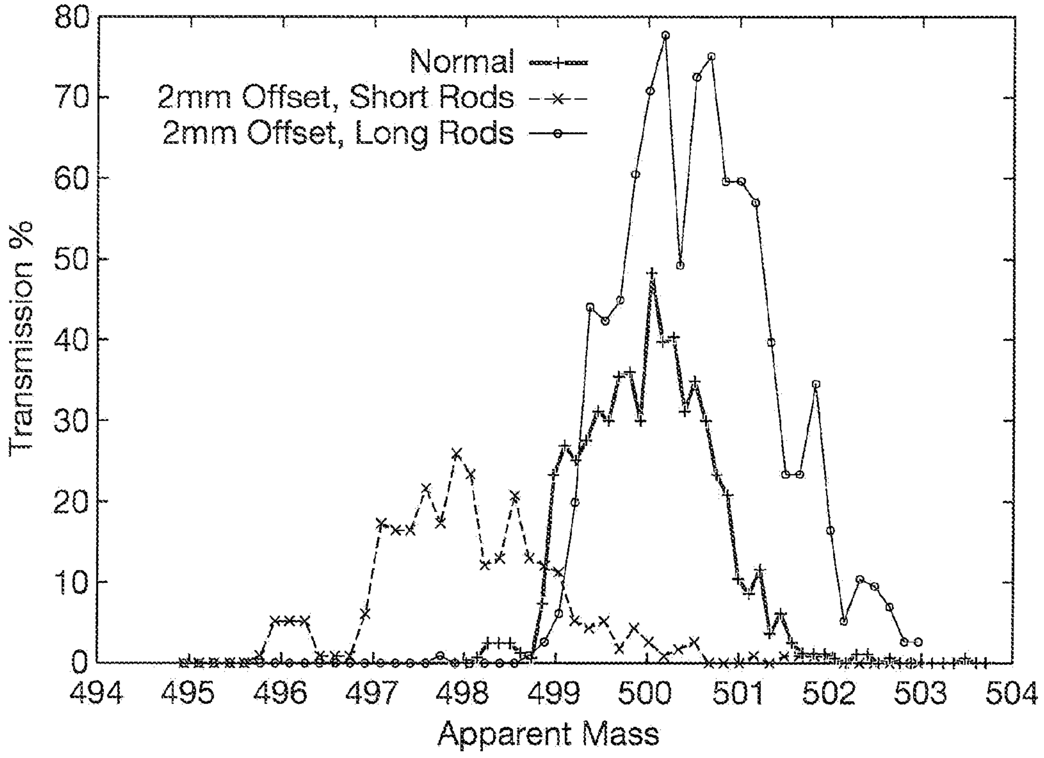
FIG. 3 shows a comparison of transmission peak plots for a conventional RF only quadrupole rod set mass analyser and a RF only quadrupole rod set mass analyser according to an embodiment of the present invention wherein one pair of rod electrodes is longer than the other pair of rod electrodes.

FIG. 3 compares transmission peak plots for a conventional system with a quadrupole rod set mass analyser according to an embodiment of the present invention wherein two of the rods are 2 mm longer than the other two rods. For ions aligned with the 2 mm longer rods, a factor of nearly x2 increase in transmission is seen relative to the conventional non-offset system. With ions aligned to the shorter rods a factor of x2 decrease in transmission is observed.

Figure 4:
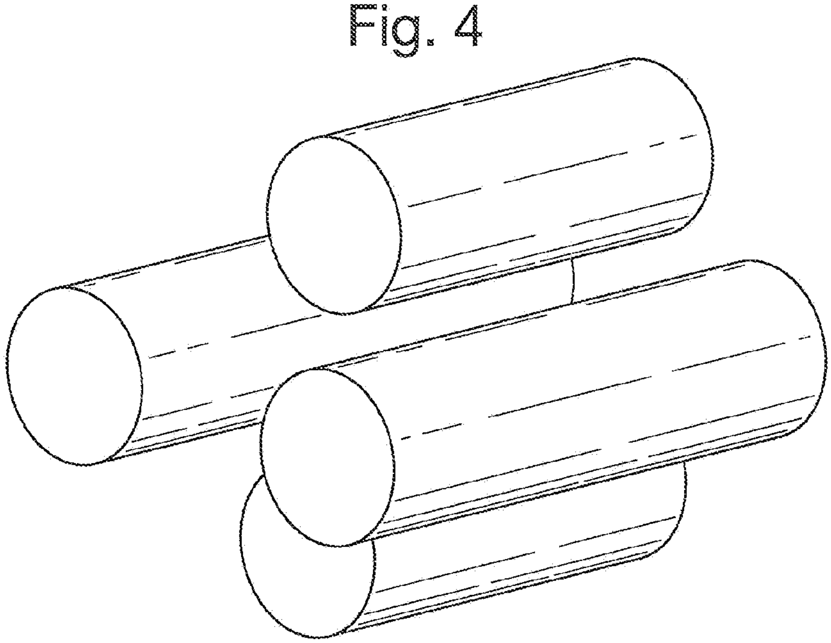
FIG. 4 shows an embodiment of the present invention comprising an offset rod arrangement wherein one pair of rod electrodes is longer than the other pair of rod electrodes.

FIG. 4 shows the quadrupole rod set mass analyser according to an embodiment of the present invention wherein the x-rods extend in the axial direction further than the y-rods.

Figure 5:
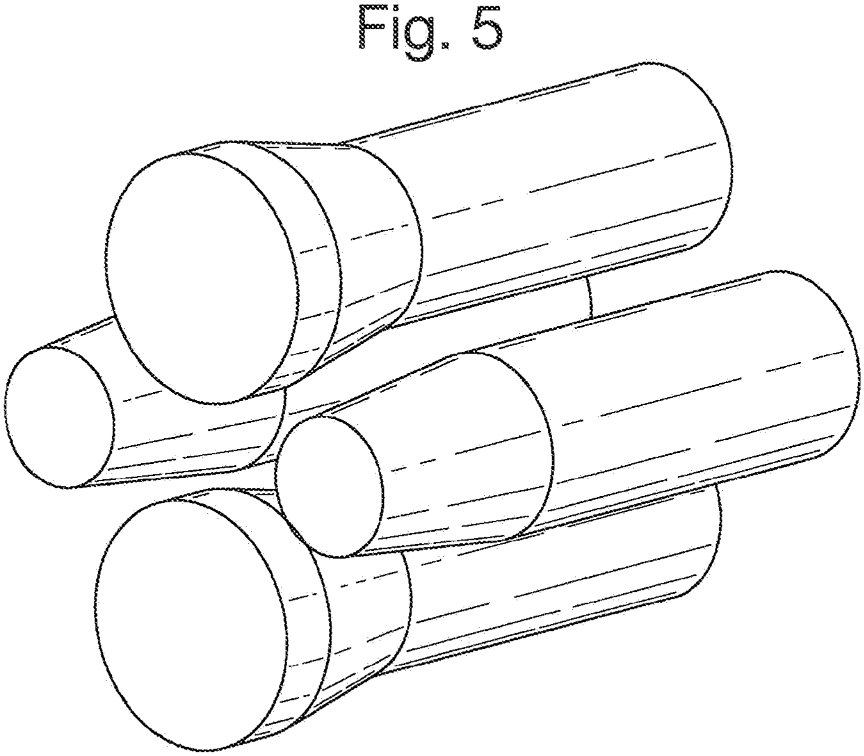
FIG. 5 shows an embodiment of the present invention wherein one pair of rod electrodes tapers near an exit region of the quadrupole rod set and the other pair of rod electrodes increases in diameter.

According to another embodiment of the present invention the radius of the rods or the inscribed sphere $r_0$ of the rods near the exit region may be varied. FIG. 5 shows an embodiment of the present invention wherein the radius of the rod electrodes varies near the exit region of the quadrupole rod set. In the particular example shown in FIG. 5 the radius of the y-rods increases towards the exit region of the quadrupole rod set whereas the radius of the x-rods reduces towards the exit region of the rod set. The diameter of the x-rods and y-rods is substantially constant in an upstream portion of the rods i.e. the diameter of the rods preferably only changes in a downstream portion of the rods.

According to another embodiment an exit member may be provided downstream of the quadrupole rod set and the exit member may be shaped such that some parts of the exit member are closer to one pair of rod electrodes than the other pair of rod electrodes. According to this embodiment there is axial variation in position of the exit member.

Figure 6:
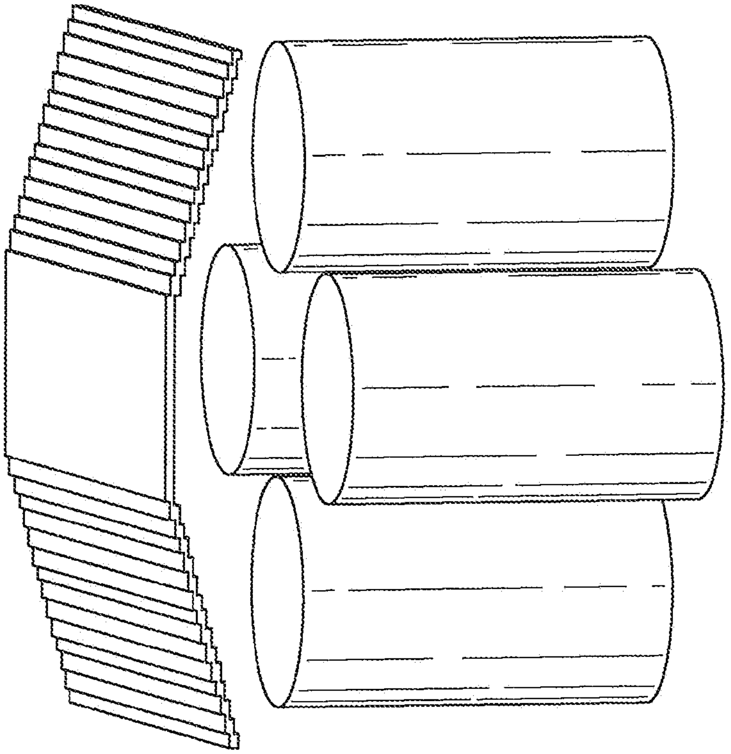
FIG. 6 shows another embodiment of the present invention wherein an exit member is provided adjacent an exit region of the quadrupole rod set and wherein the exit member is tilted towards one pair of rod electrodes.

FIG. 6 shows an example wherein the exit member is tilted in one axis so as to be closer to the y-rods than to the x-rods. However, it will be apparent to those skilled in the art that many other possible variations in the shape and/or orientation of the exit member may be contemplated.

According to a yet further embodiment the exit member may comprise one or more voids or apertures. The voids or apertures in the exit member preferably affect the effective potential. According to the preferred embodiment one or more voids, apertures, holes or slits are preferentially aligned with one rod pair rather than the other rod pair.

Figure 7:
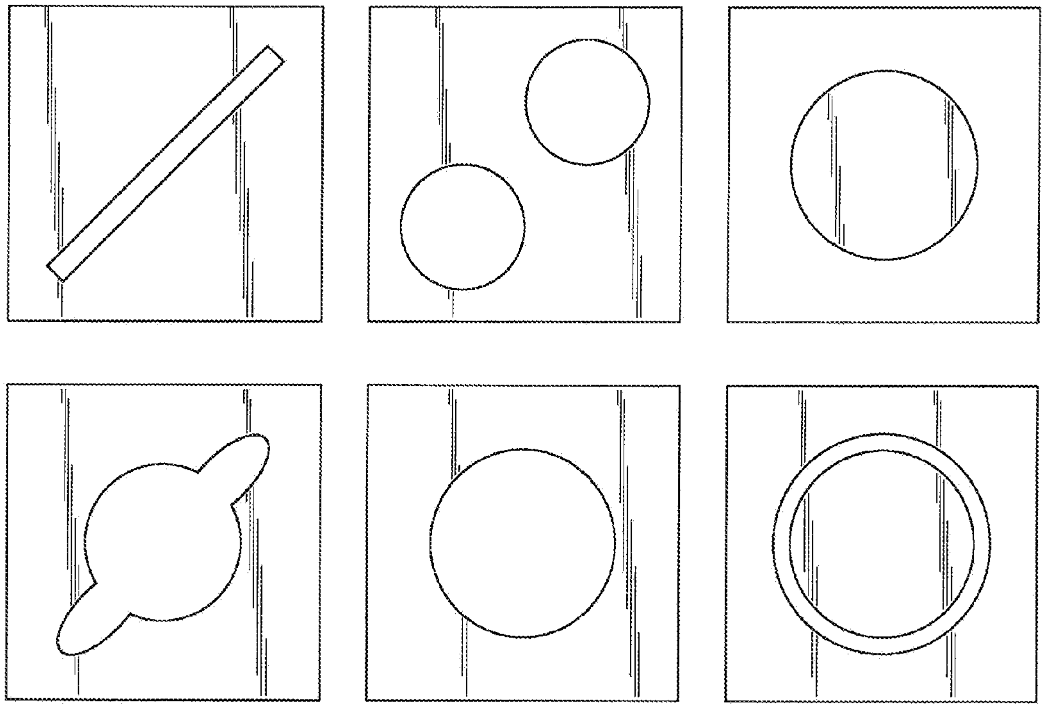
FIG. 7 shows another embodiment of the present invention wherein an exit member optionally having one or more apertures is provided adjacent the exit region of the quadrupole rod set and wherein one or more apertures may be preferentially aligned with one of the pairs of rod electrodes.

FIG. 7 shows examples of exit members, some of which have voids or apertures according to various different embodiments of the present invention.

According to various embodiments of the present invention an exit member may be provided with a slit or aperture which is preferably lined up or orientated with one rod pair.

According to an embodiment the exit member may comprise two circular holes which are aligned with one rod pair.

According to another embodiment the exit member may comprise a central circular element with no surrounding material. The central element may be offset so that it is asymmetrically disposed relative to the quadrupole rod set.

According to another embodiment the exit member may comprise a central circular hole with additional holes aligned with one rod pair.

According to another embodiment the exit member may comprises a central circular hole. The exit member may be offset so that it is asymmetrically disposed relative to the quadrupole rod set.

According to another embodiment the exit member may comprise an annular void which may be offset so that it is asymmetrically disposed relative to the quadrupole rod set.

It will be apparent to those skilled in the art that further configurations are possible.

The exit member may comprise a grid and hence there is no requirement for a void on the optic axis of the exit member for extraction.

Figure 8:
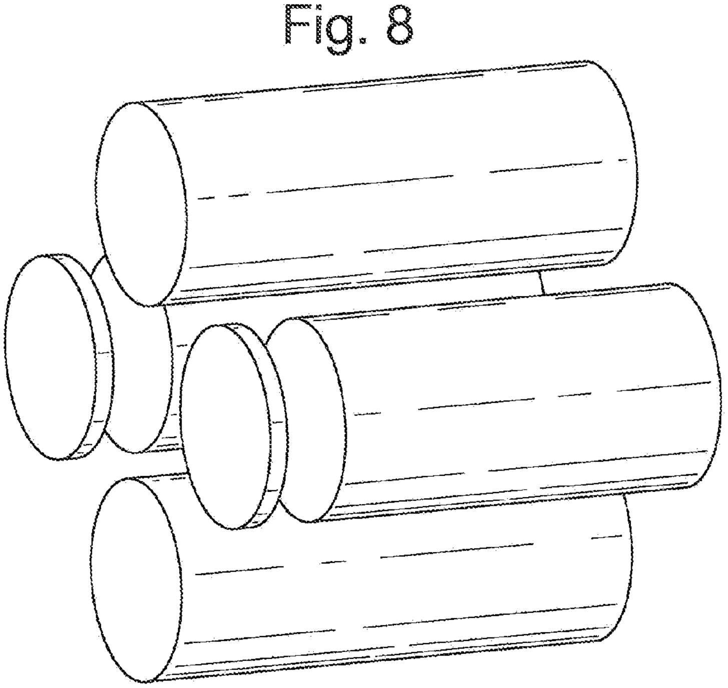
FIG. 8 shows an embodiment of the present invention wherein one pair of rod electrodes has a partial or complete void near an exit region of the quadrupole rod set.

According to another embodiment voids may be provided in the main rods near the exit region. FIG. 8 shows as example where for illustrative purposes only one rod pair of electrodes is shown having an entire slice through the rods removed near the exit region. However, other embodiments are contemplated wherein any voids in the rod electrodes are partial rather than complete voids. Furthermore, the voids may be provided just on the inwardly facing surface of the rods. According to this embodiment the outer surface of the rods may be solid i.e. no void need be provided on the outer surface of the rods.

It is intended that the embodiments described above may be combined in any combination and/or that other geometrical modifications may be made.

According to an alternative embodiment entrance and/or exit region fringing fields may be utilised or modified to affect the performance of other multipole devices. The ability to shape these fringing fields may be significant for devices such as ion guides and collision cells.

The preferred device may be used as a low cost single quadrupole rod set mass analyser or a component in a hybrid instrument. There are also other possible configurations of hybrid instruments. For example, a quadrupole mass filter in an existing hybrid geometry may be replaced by an RF only quadrupole rod set in accordance with an embodiment of the present invention.

It is to be noted that RF only quadrupoles tend to produce asymmetric peaks with sharp high mass sides and long low mass tails. If a RF only quadrupole is coupled with an upstream analyser that features a sharp high mass cutoff then the low mass tails may be trimmed off thereby improving the peak shape.

It will be understood by those skilled in the art that the small DC bias voltage which may be applied to the rod electrodes according to an embodiment of the present invention has a different effect to a resolving DC voltage applied to a conventional quadrupole mass filter. A conventional quadrupole mass filter may be operated at around a=0.23 with a DC voltage of +300 to 400V applied to a first pair of rod electrodes and a voltage of −300 to 400V applied to a second pair of rod electrodes. As a result, the mass filter has a narrow mass to charge ratio transmission window around mass to charge ratio 500. In contrast, the small DC bias voltage which may be applied to the rod electrodes according to an embodiment of the present invention is such that the quadrupole mass filter, mass analyser or ion trap may be operated at around a =0.005. The amplitude of the DC voltage applied to the first and second electrodes is preferably <10V. It will therefore be appreciated that the application of the DC bias voltage has a negligible effect upon the mass range or mass transmission window. Instead, the primary effect of the applied DC bias voltage is to align ions in the direction of one of the pairs of rods.

It will be understood that the quadrupole mass filter stability diagram is formed by superimposing x-stable and y-stable regions. Ions which are within the overlap of these two diagrams are considered stable (i.e. stable in both x and y). If an ion is only within the stable region of one of these diagrams then it is unstable in the other and will impact the rods in that axis i.e. an ion stable in x but unstable in y will undergo large oscillations in the y-axis and hit the y-rods. The upper bound of the first stability region on the a=0 axis (q just above 0.9) is a region that is unstable in both x and y-axes, hence ions are equally likely to hit either rod pair. If a small amount of resolving DC is applied then the mass scan line is moved slightly off the horizontal such that at the point of instability near q=0.9 the ion is now only unstable in one of the axes, hence the ions will undergo pronounced oscillation between only one rod pair as the RF is scanned and they approach instability. For example, applying positive DC to the y-rods causes positive ions to become unstable in the y-axis but not in the x-axis. It will be appreciated that this is still an ejection method based on the ions nearing instability and undergoing large oscillations which then couple with the fringing field to give ejection through a barrier. The small resolving DC component is not sufficient to operate the rod set as a conventional mass filter with any significant degree of resolution.

Although the present invention has been described with reference to preferred embodiments, it will be understood by those skilled in the art that various changes in form and detail may be made without departing from the scope of the invention as set forth in the accompanying claims.

The invention claimed is:

1. A quadrupole rod set mass filter, mass analyser or ion trap comprising:

a first pair of rod electrodes;

a second pair of rod electrodes; and an energy filter;

wherein said first pair of rod electrodes has a physical property which differs from a physical property of said second pair of rod electrodes, wherein said first and second pairs of rod electrodes have a first upstream portion and a second downstream portion, wherein said first and second pairs of rod electrodes have a substantially constant cross-sectional diameter or profile in said first upstream portion; characterised in that said physical property comprises axial length, and said first pair of rod electrodes has a first axial length and said second pair of rod electrodes has a second different axial length; or said first pair of rod electrodes comprise one or more partial or complete first voids located adjacent an exit region of said quadrupole rod set mass filter, mass analyser or ion trap.

2. A quadrupole rod set mass filter, mass analyser or ion trap as claimed in claim 1, wherein said physical property comprises cross-sectional profile or shape.

3. A quadrupole rod set mass filter, mass analyser or ion trap as claimed in claim 1, wherein said first pair of rod electrodes has a first cross-sectional diameter or profile which increases or decreases towards an exit region of said quadrupole rod set mass filter or mass analyser.

4. A quadrupole rod set mass filter, mass analyser or ion trap as claimed in claim 1, wherein said first and second pairs of rod electrodes have a cross-sectional radius $r_0$ in said first upstream portion, said first pair of rod electrodes have a cross-sectional radius $r_1$ adjacent an exit region of said second downstream portion and said second pair of rod electrodes have a cross-sectional radius $r_2$ adjacent said exit region of said second downstream portion, wherein $r_1>r_0>r_2$.

5. A quadrupole rod set mass filter, mass analyser or ion trap as claimed in claim 1, wherein said first upstream portion or said downstream portion comprises x % of the axial length of said quadrupole rod set mass filter, mass analyser or ion trap, wherein x is selected from the group consisting of: (i) <10%; (ii) 10-20%; (iii) 20-30%; (iv) 30-40%; (v) 40-50%; (vi) 50-60%; (viii) 60-70%; (ix) 70-80%; (x) 80-90%; (xi) >90%.

6. A quadrupole rod set mass filter, mass analyser or ion trap as claimed in claim 1, wherein said physical property comprises a dielectric coating applied to said rod electrodes.

7. A quadrupole rod set mass filter, mass analyser or ion trap as claimed in claim 1, wherein said energy filter comprises a physical barrier arranged so that ions having desired mass to charge ratios and which possess a first radial energy avoid impacting said barrier whereas ions having undesired mass to charge ratios and which possess a second radial energy impact upon said barrier.

8. A quadrupole rod set mass filter, mass analyser or ion trap as claimed in claim 1, wherein ions having desired mass to charge ratios are radially excited so as to possess a first radial energy and are accelerated axially due to fringing fields at an exit region of said mass filter, mass analyser or ion trap so that said ions having desired mass to charge ratios possess a first axial energy; and wherein ions having undesired mass to charge ratios are radially excited so as to possess a second radial energy and are accelerated axially due to fringing fields at an exit region of said mass filter, mass analyser or ion trap so that said ions having undesired mass to charge ratios possess a second axial energy.

9. A method of mass spectrometry comprising:

guiding ions through a quadrupole rod set mass filter, mass analyser or ion trap comprising a first pair of rod electrodes, a second pair of rod electrodes and an energy filter;

wherein said first pair of rod electrodes has a physical property which differs from a physical property of said second pair of rod electrodes, wherein said first and second pairs of rod electrodes have a first upstream portion and a second downstream portion, wherein said first and second pairs of rod electrodes have a substantially constant cross-sectional diameter or profile in said first upstream portion; characterised in that said physical property comprises axial length, and said first pair of rod electrodes has a first axial length and said second pair of rod electrodes has a second different axial length; or said first pair of rod electrodes comprise one or more partial or complete first voids located adjacent an exit region of said quadrupole rod set mass filter, mass analyser or ion trap.

* * * * *